H. M. GODFREY.
STREET CAR FENDER.
APPLICATION FILED AUG. 5, 1910.
1,004,774.
Patented Oct. 3, 1911.
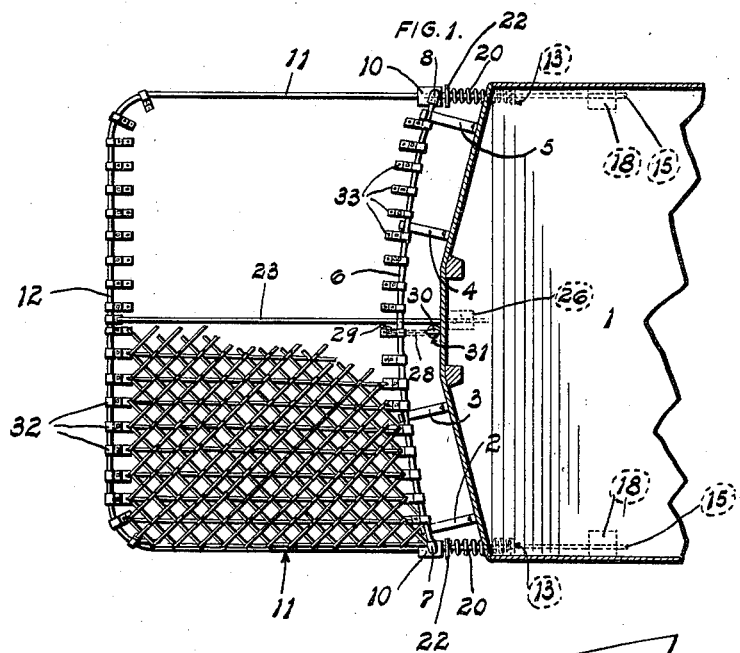
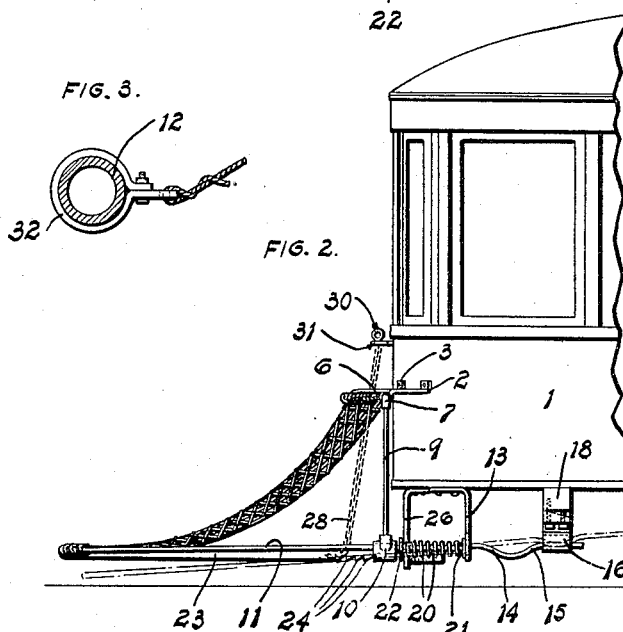
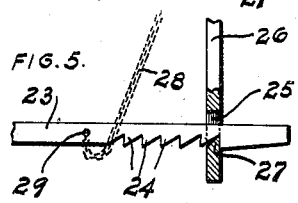
WITNESSES
INVENTOR
H. M. GODFREY
BY
ATT'Y.

UNITED STATES PATENT OFFICE.

HENRY M. GODFREY, OF JONESBURG, MISSOURI.

STREET-CAR FENDER.

1,004,774.  Specification of Letters Patent.  Patented Oct. 3, 1911.

Application filed August 5, 1910. Serial No. 575,833.

*To all whom it may concern:*

Be it known that I, HENRY M. GODFREY, a citizen of the United States, residing at Jonesburg, Missouri, have invented a certain new and useful Improvement in Street-Car Fenders, of which the following is a full, clear, and exact description, such as will enable others skilled in the art to which it appertains to make and use the same, reference being had to the accompanying drawings, forming part of this specification, in which—

Figure 1 is a plan view of my improved fender as applied to an ordinary street car. Fig. 2 is a side elevation of my device. Figs. 3, 4 and 5 are views of details of construction.

This invention relates to an improved form of fender to be applied to any moving vehicle, but is more especially adapted for street car service.

The object of my invention is to overcome certain defects in the type of fenders now found on the market. It is well known that the fenders now used do not in all cases avoid injuring the person of one who is so unfortunate as to be in the path of a moving vehicle or car.

My invention resides in constructing a fender so that when it strikes an obstacle, it will give to a certain extent against the action of a spring, and will be caught or retained in its retracted position so as to avoid any reaction on the part of the spring after it has been compressed. The improved fender is also constructed to readily bend downward when it strikes an obstruction, and may be easily and readily attached to and taken from a vehicle or car.

Referring to the accompanying drawings 1 indicates the car body although it is readily seen that this type of fender may be applied to various forms of vehicles, as for instance, automobiles.

2, 3, 4 and 5 indicate brackets suitably attached at intervals across the front of the car with hooked ends. The fender proper is comprised of sections of ordinary iron pipe, to form a frame work supporting the netting.

6 is a section of pipe which is curved to fit easily across the front of the car and be supported by the brackets 2, 3, 4 and 5. On the ends of the section 6 are elbows 7 and 8 which connect with vertical pipe sections, one of which 9, is indicated in Fig. 2. At the bottom of the pipe sections 9 are ordinary T pipe joints 10, which are made large enough to allow other pipe sections 11 to slide easily and move downward therein. The sections 6 together with section 9 form a top piece or member. The sections 11 form the sides of the frame, the front section of which is designated 12.

The frame formed by the pipe sections 11 and 12 may be all in one piece, or in several sections as desired. The sections 11 are on either side of the car and pass through an opening in the brackets 13, suitably attached to the bottom of the car body on either side. The pipe sections are also bent downward as shown at 14 and then upward as at 15 to form a curved portion or projection between two straight portions. The end of the sections fit in and pass through guide brackets 16 loosely, to allow the curved portion to pass into the bracket to a certain extent. The bracket 16 may be of any suitable construction, that illustrated being an elongated vertical ordinary form with a bearing head portion having an opening therein, and a flanged portion 17 adapted to be attached to a block 18, fastened to the bottom of the car. The brackets 13 and 16 form bearings in which the pipe sections may slide, and in sliding, due to the curved shape of the pipes the front end of the section is moved downward.

The bracket 16 is provided with suitable lag screws to attach the same to the block 18, and if desired may be also provided with set screws 19 to bear against the block in case it is necessary to change the angularity of the opening in the block, to provide an easy passage for the pipe sections 15. This construction may be used, but is not necessary to my device.

Mounted on the pipe sections 11 are spiral compression springs 20 bearing against a collar 21, loosely surrounding the pipe section and backed by the bracket 13 at one end, and a collar 22 fastened to the pipe at the other. In the middle of the pipe section 12 of the fender frame is suitably connected a flat bar 23 having rack teeth 24 at one end thereof. This bar fits within an enlarged opening 25 in a bracket 26, fastened to the bottom of the car at the middle thereof. This opening 25 is provided with a saw-shaped tooth 27 adapted to engage with the rack 24. A chain 28 is connected at the opening 29 to the bar 23 and at its upper end is provided with an eye bolt or handle 30. This chain passes through a suitable supporting eye bolt 31 fastened to the car body in a position to be easily reached by the motorman. The pipe sections 6 and 12 are connected by means of a netting comprised of tarred rope interwoven as illustrated in Fig. 1. The ends of the rope are connected to suitable clamping devices 32 on the section 12, and 33 on the section 6, in such a manner as to allow the netting to form in an easy curve as illustrated in Fig. 2.

In Fig. 1 I have shown the netting as broken away in order to illustrate certain features of the device beneath the netting, but it is to be understood that the netting reaches across the front of the car between the pipe sections 11 on either side thereof.

If the car in movement strikes a person or a wagon the fender will be moved downward into the dotted line position shown in Fig. 2 due to the curved portion of the same without undue strain on any section of the pipe. Further, the pipe sections of the fender 11 will be retracted against the action of the springs 20, and the fender frame will be held in the retracted position due to the catch formed by the teeth 27 engaging the rack 24, so that there will be no rebound forward of the fender until the motorman draws up the chain 28 to withdraw the rack 24 from the tooth 27, when the springs are free to act to push the fender back in normal position. By my improved device, therefore, the force of the blow is broken and there is no danger of rebound which would tend to throw the person off of the fender, having once fallen thereon.

My invention is a simple construction of fender which may be easily applied and removed from a car or other vehicle. I have illustrated my device as applied to a street car, but it is clear that it is adapted to be used with slight modification on automobiles or any other type of vehicle desired.

It will be readily seen that minor changes in the form and size of the various parts of my improved device may be made and substituted for those herein shown and described without departing from the spirit of my invention. For example, it is not necessary to use piping for the frame work of my improved fender, nor to use tarred rope, for the netting. Solid iron bars could be used for the frame work and wire netting or any other type of netting for the tarred rope.

I claim:

1. In a device of the character described, a frame-work comprising side and front sections, a top piece loosely connected to said side sections to allow sliding movement of the side sections within the top piece, a netting attached to the front section and top piece, and yielding means adapted to retain the side sections in a forward position.

2. In a device of the character described, a frame-work comprising front and side sections, yielding means connected to the side sections for retaining the frame work in forward position, and a locking bar connected with the front section for holding the frame-work in retracted position against the action of the yielding means.

3. In a device of the character described, a frame work comprising front and side sections, yielding means connected to the side sections for retaining the frame work in forward position, a locking bar connected with the front section for holding the frame work in retracted position against the action of the yielding means, and means for unlocking the bar to allow the yielding means to return the frame work to normal position.

4. In a device of the character described, a frame work having side and front sections, each side section having a downwardly extending projection formed therein, and supporting brackets for said side sections with heads having openings or bearings therein adapted to slidably support the projecting portions of the side sections.

5. In a device of the character described, a framework comprising side and front sections, a top piece having connected parts with apertures therein adapted to slidably support the side sections of the framework, a netting attached to the front section and top piece, and means adapted to yieldingly retain the side sections in their forward position.

6. In a device of the character described, a framework comprising front and side sections, means for slidably and yieldingly supporting the side sections in forward position, and a locking device to hold said side sections in retracted position, against the action of said yielding means, comprising a toothed bar attached to the frame work and a fixed bracket having a tooth coöperating with the teeth on the bar.

7. In a device of the character described, a vehicle having open brackets attached to the front thereof and apertured brackets attached on the under side thereof, a framework comprising front and side sections, said side sections being slidably supported in the apertures of the brackets underneath the vehicle, and a top section supported in the open brackets on the vehicle and having extensions with suitable openings in which the side sections of the framework are slidably mounted.

In testimony whereof I hereunto affix my signature in the presence of two witnesses, this 29th day of July, 1910.

HENRY M. GODFREY.

Witnesses:
M. P. SMITH,
J. W. CLIFT.

Copies of this patent may be obtained for five cents each, by addressing the "Commissioner of Patents, Washington, D. C."